United States Patent
Sherman (10) Patent No.: US 9,066,311 B1
(45) Date of Patent: Jun. 23, 2015

(54) NETWORKED NAVIGATION AND RANGING METHODS

(75) Inventor: Matthew J. Sherman, Succasunna, NJ (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 615 days.

(21) Appl. No.: 13/495,330

(22) Filed: Jun. 13, 2012

Related U.S. Application Data (60) Provisional application No. 61/520,794, filed on Jun. 15, 2011.

(51) Int. Cl.
| | |
|---|---|
| H04W 68/00 | (2009.01) |
| H04W 64/00 | (2009.01) |
| H04J 1/00 | (2006.01) |

(52) U.S. Cl.
CPC .............. *H04W 68/00* (2013.01); *H04W 64/00* (2013.01)

(58) Field of Classification Search
CPC ....... H04W 68/00; H04W 64/00; H04J 12/26; H04J 1/00; H04B 17/00
USPC ............ 455/41.2, 67.11, 67.16, 69, 130, 423, 455/456.1–456.6; 370/252, 281, 338, 347, 370/350, 516
See application file for complete search history.

(56) References Cited

U.S. PATENT DOCUMENTS

| | | | | |
|---|---|---|---|---|
| 7,203,500 | B2* | 4/2007 | Leeper et al. ............... | 455/456.1 |
| 7,209,469 | B2* | 4/2007 | Runkle et al. ................. | 370/347 |
| 7,313,164 | B1* | 12/2007 | Wilson et al. ................. | 375/141 |
| 7,750,841 | B2* | 7/2010 | Oswald et al. ................ | 342/147 |
| 8,054,865 | B1* | 11/2011 | Frost .............................. | 375/140 |
| 8,086,249 | B1* | 12/2011 | Dinan et al. ................ | 455/456.1 |
| 8,131,215 | B2* | 3/2012 | Swope et al. ................ | 455/41.2 |
| 8,270,455 | B2* | 9/2012 | Sanji et al. ..................... | 375/142 |
| 8,477,826 | B2* | 7/2013 | Sanji et al. ..................... | 375/145 |
| 8,600,420 | B2* | 12/2013 | Lee et al. ....................... | 455/517 |
| 8,615,265 | B2* | 12/2013 | Braiman ........................ | 455/517 |
| 8,855,044 | B2* | 10/2014 | Liao et al. ..................... | 370/324 |
| 8,976,060 | B2* | 3/2015 | Schaffner ...................... | 342/132 |
| 2004/0085943 | A1* | 5/2004 | Hsu et al. ...................... | 370/338 |
| 2005/0281247 | A1* | 12/2005 | Lim et al. ...................... | 370/350 |
| 2006/0094436 | A1* | 5/2006 | Kim et al. ..................... | 455/450 |
| 2006/0239241 | A1* | 10/2006 | Eom et al. ..................... | 370/348 |
| 2009/0017782 | A1* | 1/2009 | Monat et al. .................. | 455/130 |
| 2010/0278097 | A1* | 11/2010 | Li et al. ......................... | 370/315 |
| 2011/0058494 | A1* | 3/2011 | Frei ............................... | 370/252 |
| 2011/0128995 | A1* | 6/2011 | Sanji et al. ..................... | 375/145 |
| 2011/0129218 | A1* | 6/2011 | Kim ............................... | 398/45 |
| 2012/0252503 | A1* | 10/2012 | Wu ............................. | 455/456.6 |
| 2013/0282875 | A1* | 10/2013 | Aweya et al. ................. | 709/219 |
| 2013/0287049 | A1* | 10/2013 | Algie et al. ................... | 370/516 |
| 2014/0226984 | A1* | 8/2014 | Roberts et al. ................. | 398/66 |

* cited by examiner

*Primary Examiner* — Khawar Iqbal
(74) *Attorney, Agent, or Firm* — Sand & Sebolt; Daniel J. Long (57) ABSTRACT

A system and method for calculating a range delay is presented. A method begins by transmitting a first message at a first transmit time at a lower layer of a first node to a second node. A first service primitive is sent is sent to an upper layer associated with the first node with the first transmit time. A second message is received at the lower layer containing a first receive time of the first message at the second node. A second receive time of the second message is determined and sent with a second service primitive with the first receive time to the upper layer. A range delay is calculated in the upper layer based on one or more of the first transmit time, the first receive time and the second receive time.

17 Claims, 6 Drawing Sheets

NETWORKED NAVIGATION AND RANGING METHODS

CROSS REFERENCE TO RELATED APPLICATION

This application claims priority from U.S. Provisional Patent Application Ser. No. 61/520,794, filed Jun. 15, 2011; the disclosure of which is incorporated herein by reference.

BACKGROUND OF THE INVENTION

1. Field of Invention

The current invention relates generally to apparatus, systems and methods for locating mobile units using wireless messaging. More particularly, the apparatus, systems and methods relate to locating mobile units with navigation and ranging. Specifically, the apparatus, systems and methods provide for locating mobile units using networking layers above the Organization for Standardization's (ISO) Open Systems Interconnection (OSI) model's Medium Access Controller (MAC) layer.

2. Description of Related Art

In the prior art, many systems need a "Denied GPS" capability, in that they must be able to determine their local time and position even if GPS signals are unavailable. Certain known systems provide such a capability. The terminals in such systems may tend to be very specialized, and hence very expensive. The prior art systems were expensive because they often required special hardware at the lower Physical (PHY) layer and the MAC layer that needed to calculate, often with hardware, their range, time and position. A need, therefore, exists for a way to more cost effectively determine range, time and position and to determine it in a way that can be leveraged by many different types of navigation links.

SUMMARY

According to the present invention, a standard interface is provided for which radio links can be designed. Thus, it is possible to pass appropriate information to a networked navigation entity (code set) that can process this data across a variety of links and share information with peer networked navigation entities. Therefore, navigation and position knowledge of all nodes in the network can be enhanced.

The preferred embodiment of the invention includes a method for calculating a range delay. The method begins by transmitting at a lower layer of a first node a first message at a first transmit time to a second node. In some configurations of the preferred embodiment, a transmit service primitive is sent from the upper layer to the lower layer instructing the lower layer to send the first message. The lower layer sends the first message responsive to the transmit service primitive. A first service primitive is sent from the lower layer to an upper layer associated with the first node and the first service primitive contains the first transmit time. A second message is received at the lower layer of the first node that contains a first receive time of the first message at the second node. A second receive time of the second message is determined in the lower layer of the first node and is sent with the first receive time by a second service primitive to the upper layer. A range delay is calculated in the upper layer based on one or more of the first transmit time, the first receive time, a second transmit time of the second message from the second node and the second receive time.

In some embodiments, the first transmit time is represented as TD1-N, the first receive time is represented as RD2-N, the second transmit time is represented as TD2-M and the second receive time is represented as RD2-M. The range can be according to: range delay value=(RD2N−TD1N+RD1M−TD2M)/2. Other parameters can also be used to calculate the range. For example, the second message can contain a velocity of the second node. Calculating the range delay can be based, at least in part, on the velocity. The second message can also contain an accuracy value of the first transmit time. The calculation of the range delay can be based, at least in part, on the accuracy of the first transmit time.

Some configurations of the preferred embodiment include receiving a third message at the lower layer of the first node. This message contains the second transmit time of the second message from the second node. The method sends a third service primitive from the lower layer to the upper layer. The third service primitive includes the second transmit time. The first service primitive is processed in an upper layer that is above the International Organization for Standardization's (ISO) Open Systems Interconnection (OSI) model's data link layer. The transmit service primitive is processed in a lower layer that is lower than the ISO OSI model's network layer. The first service primitive, the second service primitive and the transmit service primitive can be generated so that they communicate between the lower layer and the upper layer using standardized commands and parameters.

Another configuration of the preferred embodiment includes a method for determining a range delay between two radios. The method transmits from lower layers in a first radio one or more wireless messages to a second radio. The lower layers in a first radio receive one or more wireless messages from the second radio. One or more service primitives are sent from the lower layers in the first radio to higher layers associated with the first radio. The one or more service primitives contain one or more message parameters of the wireless messages transmitted to the second radio and the wireless messages received at the lower layers from the second radio. A range delay is calculated in the upper layers based, at least in part, on the message parameters.

In other configurations of this embodiment, the one or more service primitives are sent through a standard network serviced access point (NSAP). The NSAP allows different lower layers in other different radios to communicate through the standard NSAP to the higher layers. The one or more service primitives are sent from the lower layers in the first radio to the higher layers associated with the first radio using a standard service primitives with standard primitive parameters.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal

Similar numbers refer to similar parts throughout the drawings.

DETAILED DESCRIPTION

Figure 1:
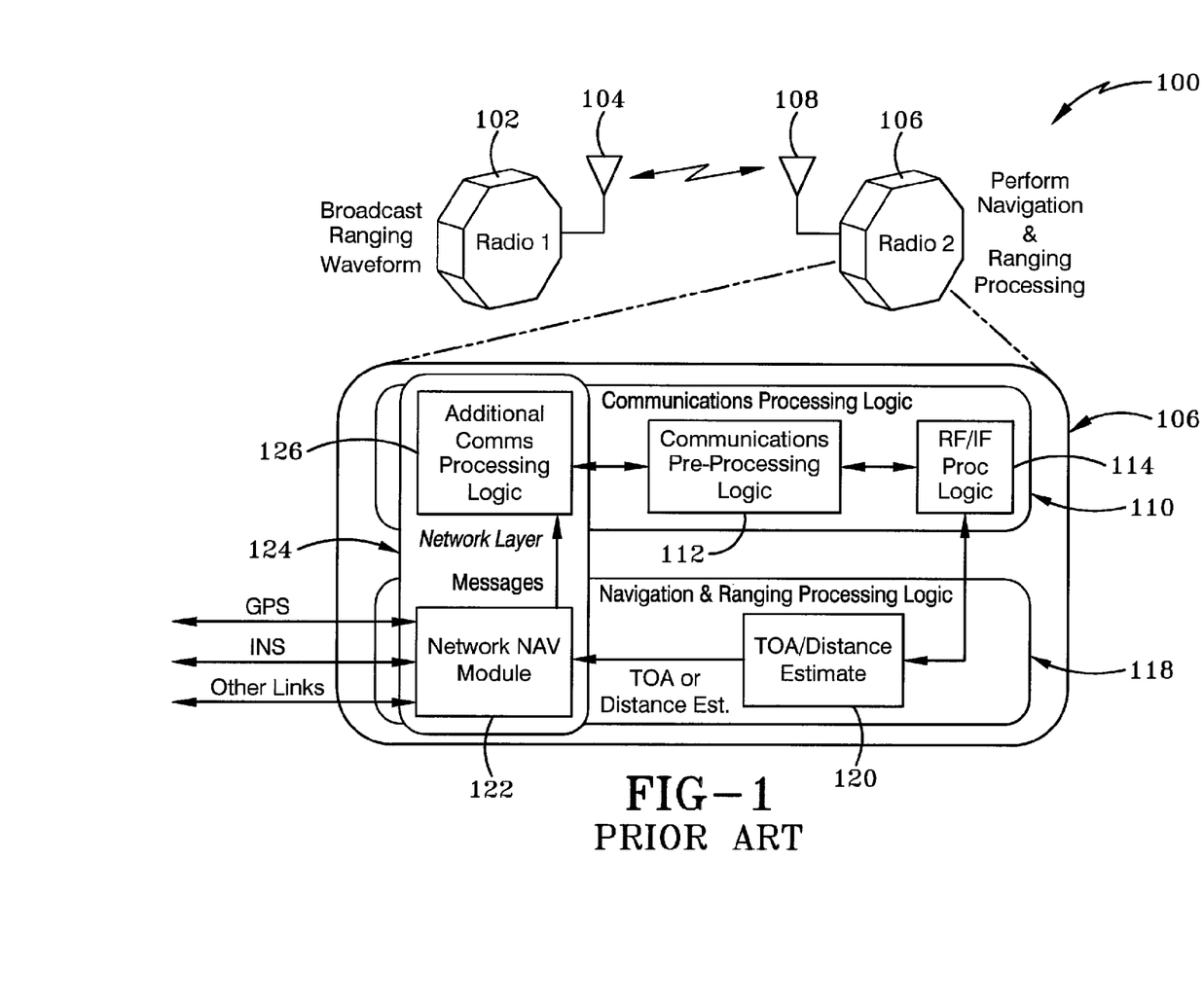
FIGS. 1 and 2 illustrate schematics of prior art navigation and ranging systems.
Figure 2:
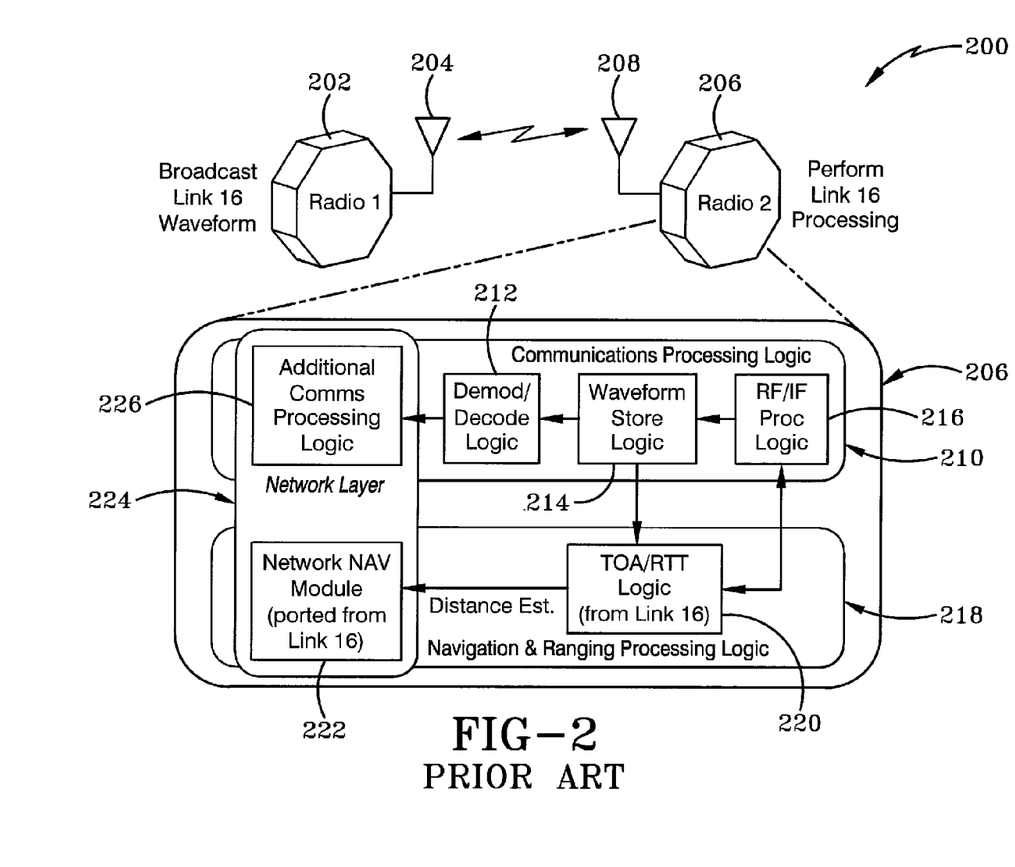

FIGS. 1 and 2 illustrate schematics of prior art navigation and ranging systems 100, 200. These systems 100, 200 are illustrated with a first node 102 with an antenna 104 and a second node 106 with an antenna 108. The first and second nodes can be wireless radios that transmit wireless messages to and from one another. Received (and transmitted) messages are first processed by communications processing logic 110, 210. The communications processing logic 110, 210 generally performs traditional operations on a signal to be transmitted or received. This processing could relate to a variety of protocols including for example Link 16, SRW, WNW, 802.11, 802.16, LTE, DVB-S2, and other protocols. The prior art systems illustrated in FIGS. 1 and 2 require precise timing information to operate. The primary information they need is "ranging" information (e.g., distance) which can be directly determined or inferred based on data such as the time of arrival of messages. To quickly calculate accurate ranging values, systems 100, 200 perform those functions in the lower International Standards Organization (ISO) layers such as the MAC and PHY layers. Thus, these systems 100, 200 operate on lower parts of a radio frequency (RF) waveform because they require precise timing information to operate.

For example, the communications processing logic 110 of the system of FIG. 1 includes communications pre-processing logic 112 and RF/IF processing logic 114. The communications pre-processing logic 112 can perform standard signal processing tasks such as modulation or demodulation of signals. The RF/IF processing logic 114 may add the signal to a carrier frequency when transmitting a signal or remove a signal from a carrier frequency when receiving a signal. The communications pre-processing logic 112 can then demodulate and decode the signal.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics. Components labeled "unit", "module" and the like can also be considered to be at least partially formed with "logic" as defined above.

In the other prior art example of FIG. 2, the communication processing logic 210 includes a demodulation/decode logic 212, a waveform storage logic 214 and an RF/IF processing logic 216. Similar to FIG. 1, the RF/IF processing logic 216 of FIG. 2 may add the signal to a carrier frequency when transmitting a signal or remove a signal from a carrier frequency when receiving a signal. A portion of the signal may be stored in the waveform storage logic 214 before the signal is demodulated and decoded in the demodulation/decode logic 212.

The prior art systems 100, 200 each perform navigation and ranging operations below the ISO network layer in navigation and ranging logic 118, 218. This processing could for example be similar to that which is employed in a Link 16 radio system or could use methods such as described in U.S. patent application Ser. No. 13/022,078 which is incorporated by reference in its entirety. In general, FIGS. 1 and 2 illustrate traditional signal processing operations which are performed in the communication processing logic 110, 210 and the somewhat separate navigation and ranging functions are performed in the navigation and ranging logic 118, 218. The navigation and ranging logic 118 of the prior art system 100 of FIG. 1 includes time of arrival (TOA)/distance estimate logic 120 that estimates the TOA and/or distance and passes this information up to network navigation (NAV) module 122. The navigation and ranging logic 118 of the prior art system 200 of FIG. 2 includes a TOA/Round Trip Time (RTT) logic 220. The TOA/RTT logic 220 calculates a distance that is then input to the Network NAV module 222. In this system 200, the TAO/RTT logic 220 and the Network NAV module 222 may have the capability to operate in a Link 16 environment where Link 16 is a military tactical data exchange network created and used by the United States and adopted by some of its allies and by NATO. Its specification is part of the family of Tactical Data Links and is specified in the United States Department of Defense Link 16 MIL-STD.

In FIGS. 1 and 2, similar functionality and communications between the communication processing logic 110, 210 and the navigation and ranging functions in the navigation and ranging logic 118, 218 are shown grouped together as link communication units 124 and 224 respectively for system 100 and system 200. The communication processing logic 110, 210 includes additional communication processing logic 126, 226 that performs signal processing not performed by other logic in the communications processing logic 110, 210.

In summary, the prior art systems of FIGS. 1 and 2 each try to fully complete all navigation and ranging algorithms in the lower physical and MAC layers. However, fundamentally, the navigation algorithms do not need to operate at a high rate. They can be implemented in "C" or other high level programming languages. By using standard interfaces, the protocols can sit on top of many different RF links and combine data from multiple links as long as standardized interfaces exist to pass the data. Protocols can even be implemented above the link completely (e.g., at the ISO "network" layer) assuming appropriate ways of passing time of arrival and transmission data exists.

Figure 3:
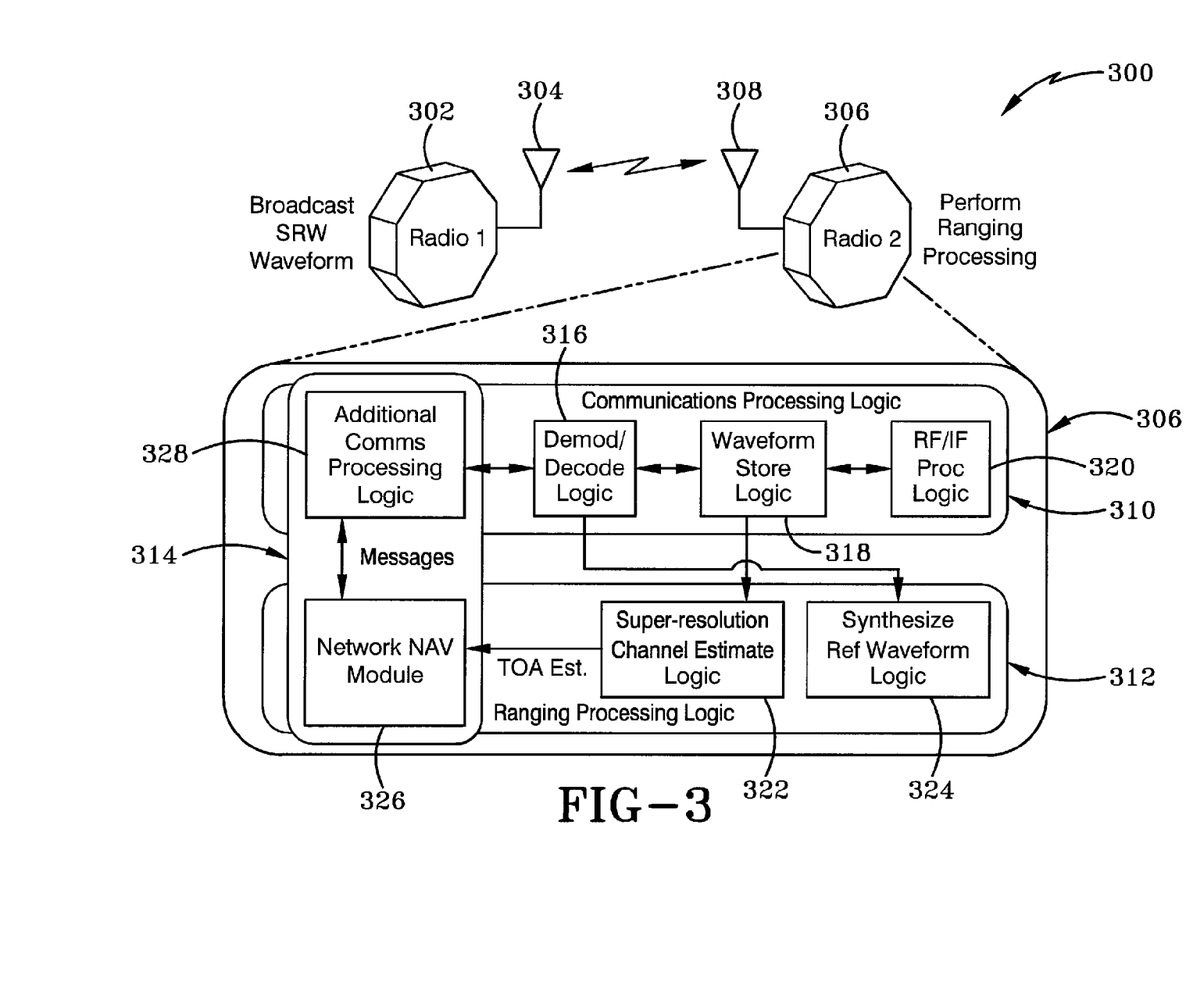
FIG. 3 illustrates the schematic of a preferred embodiment of a ranging system that performs ranging calculations in upper layers above the MAC layer of the OSI model.

FIG. 3 illustrates one example of the preferred embodiment configured as a system 300 that processes significant portions of navigation and ranging functions in upper layers such as in the ISO network layer or higher. The system 300 includes a communications processing logic 310, ranging processing logic 312 and a link communications unit 314. The communications processing logic 310 includes demodulation/decode logic 316, waveform store logic 318 and RF/IF processing logic 320. These components perform traditional signal processing functions as described above with reference to FIG. 2. The ranging processing logic 312 includes a super-resolution channel estimate logic 322 and a synthesized reference waveform logic 324. Other forms of TOA estimation logic (such as currently used in Link 16 or GPS) could also be practiced with this invention, but the super-resolution technique is preferred. These logics calculate a TOA estimate and input the estimate into a Network NAV module 326 in the link communications unit 314. The link communications unit 314 also has an additional communication processing logic 328 that performs traditional signal processing function not performed by the rest of the communication processing logic 310. The link communications unit 314 also has a path to communicate messages between the Network NAV module 326 and the additional communication processing logic 328.

In a typical system that determines ranging and navigation of a node, typical data that needs to be determined and passed include time of arrival (TOA), accuracy of TOA, position, position accuracy and node identification (ID). Time needs to be unambiguously defined. For example, for one foot type of positioning accuracies it is suggested that the least significant bit (LSB) of the data format represent 100 pico seconds. Most typically the accuracy of TOA data would be represented with an estimate of the standard deviation of the TOA data. When providing the distance it can be directly provided where the distance (or corresponding TOA) is inferred to be between two known points. The distance could be represented in 10 centimeter or tenth of a foot resolution with a standard deviation of similar measure. Position accuracy can also be represented such as is typically output from a GPS device and a position accuracy should also be provided. TOA, distance, or position is typically associated with a particular node or node pair as specified by the node ID.

Figure 4:
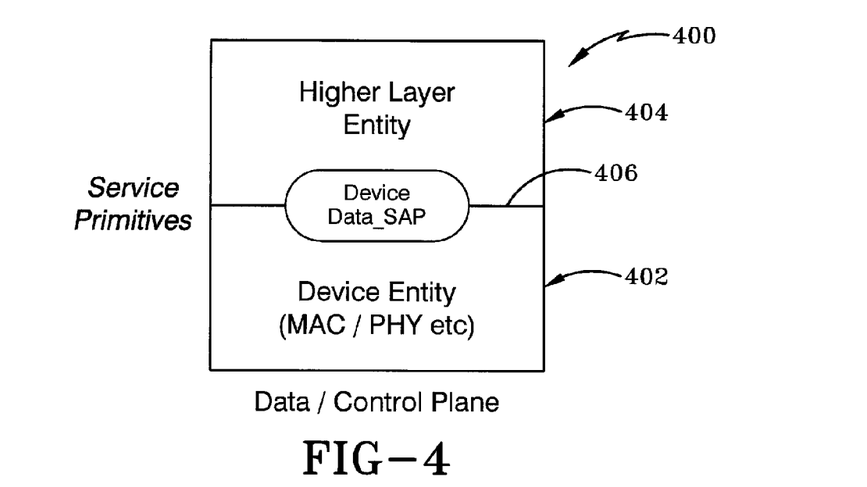
FIG. 4 is a schematic drawing illustrating logical entities of the preferred embodiment.

FIG. 4 illustrates the preferred embodiment as a system and/or method that isolates the process 400 of computing range delay from the detailed hardware implementation. Often this is done through 'Device Drivers' where the hardware is accessed through an interface using constructs such as Sockets, loctals, etc. An RF device often logically partitions its functions into a PHY, MAC (often including a Link Layer) 402 and higher layers 404 such as Network, Session, Application, etc. These layers may be defined according to the Organization for Standardization's (ISO) Open Systems Interconnection (OSI) "7-layer" model. Details of the implementation normally may deviate from this strict logical partitioning, but will ensure that all the functionality defined in the partitions is present in order to be compliant. Those of ordinary skill in the art will understand that logical entities are defined to represent the higher layers (HL) and the lower layers (Device) and will translate them to specific hardware and software implementations for the method of this invention. As will be understood by those of ordinary skill in the art, only the 'Data/Control' plane is shown, but implementing some aspects of the invention using the 'Management' plane would be with within the spirit of the invention. To describe the invention, it is assumed the HL and Device communicate with each other at a logical "Service Access Point" (SAP) 406 using "service primitives".

Figure 5:
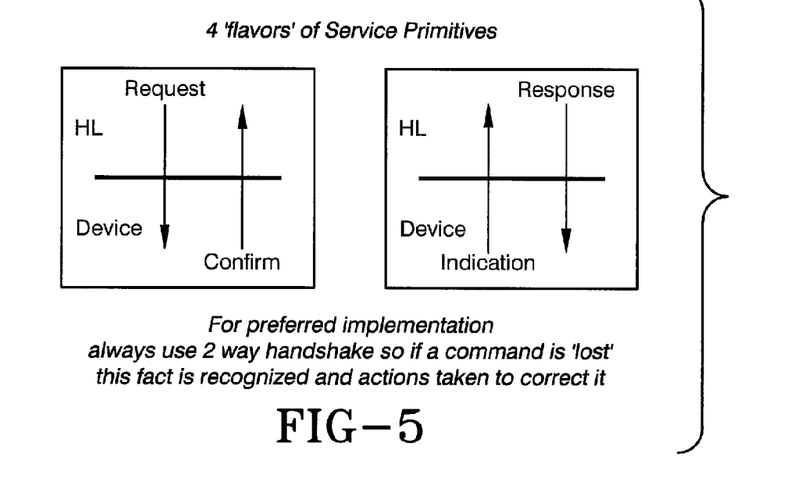
FIG. 5 is a schematic drawing illustrating "Service Access Point" (SAP) Generic Service Primitives of the preferred embodiment.

Referring to FIG. 5, the service primitives shown in this section constitute a "preferred implementation" and are not meant to limit the scope of the preferred embodiment. For instance, some implementations may wish to omit the transaction sequence numbers (Trans_Seq) meant to uniquely identify each transaction over the SAP. Timing accuracy may be omitted or specified via a separate service primitive, possibly over a "management SAP". The requirement that transactions occur in pairs can be removed assuming high reliability of the interface. Buffer pointers rather than actual messages may be passed over the interface. All such modifications would be within the spirit of the invention. Tx_Time and Rx_Time are timestamps used to indicate the transmit and receive times of messages. They might be associated with other primitives. For instance, the Tx_Time might be specified by the upper layers as part of DEV_TX_MESG_REQ. Also, additional parameters such as message lengths, transmit/receive addresses, etc. may be added to the primitives without impacting the method. Many other variations would be 'obvious' to one of ordinary skill in the art, but the key is the transfer of information about message reception and transmit times.

Table 1 illustrates an example table showing a few examples of some preferred service parameter formats.

TABLE 1

| Parameter | Format |
|---|---|
| Trans_Seq | 32 bit unsigned integer defining the transaction sequence number. This is a unique identifier for each transaction over the device SAP. It allows reference back to prior transactions. Each new transaction gets a value of Trans_Seq so that it is one more than the prior transaction modulo 21^32. |
| Message | The message generally need not have a fixed format. They may be multiple message types. Typically it might include a length filed to say how many bits, bytes or words it consists of, and the actual message itself. Often it is referenced indirectly by a pointer to a buffer containing the information. Additional side information may be included with a message such as what frequency it was received or transmitted at, if it is in error, what modulation or coding is associated with the message, etc. |
| Rx_Time | 32 bit unsigned integer defining the received time of a message. The least significant bit (LSB) would represent 1 nanosecond. |
| Rx_Acc | 32 bit unsighted integer defining the variance (accuracy) associated with the receive time (Rx_Time). The least significant bit (LSB) would represent 1 nanosecond. The value FFFFFFFF hex would represent an unknown variance. |
| Tx_Time | Same as Rx_Time except for transmit messages. |
| Tx_Acc | Same as Rx_Acc except for transmit messages. |

Time Stamps (format)—Rx_Time and Tx_Time are time stamps used in the protocol for when messages are sent and received. They should be of sufficient range and resolution to uniquely determine range delay. The number of bits allocated to represent the time stamps must be sufficient to accommodate the worst case expected delay such that (RD1 M−TD1 N) as defined later when evaluated in modulo arithmetic does risk mapping one range delay into another. Acceptable sizes for time stamp representations would be 2 bit to 64 bit unsigned integers with a preferred implementation being 32 bits. The resolution of the smallest bit could correspond times from 1 femtosecond to 1 second with 1 nanosecond being a preferred implementation.

Time Stamps (reference)—The time stamps should be referenced to a fixed point in the protocol and a fixed point on the device in space. A preferred implementation would use the beginning of the first symbol used to transmit the message as the reference point in the protocol. A preferred implementation would use the antenna to medium interface as the reference point in space. If multiple antennas radiate or receive at once, a separate reference for each should be provided (preferred) or one each of the transmit and receive antennas should be selected as the reference for all messages. In the case of a fragmented message, only the first symbol of the first fragment would serve as the protocol reference.

Time Stamps (accuracy)—Resolution and accuracy are often two very different things. Many algorithms for processing the time stamps need to know not just the time stamp but how accurate it is. In some cases, the accuracy may be inferred or assumed. However, the protocol should allow for explicit statement of the time stamp accuracy. For the preferred implementation shown here, the parameters Tx_Acc and Rx_Acc are used. Acceptable ranges of sizes would be 2 bit to 64 bit unsigned integers with a preferred implementation being 32 bits. The resolution of the smallest bit could correspond to times from 1 femtosecond to 1 second with 1 nanosecond being a preferred implementation. A value should be reserved for unknown accuracy (for a preferred implementation FFFFFFFF Hex). Ideally, the time stamp should account for any processing time, delays through components, cables, etc. to bring the reference point to the antenna. If not accounted for, these items should be included in the error estimate. The error estimate should also include clocking and other accuracies.

Table 2 illustrates example service primitives that can be used to communicate between the HL 404 and the device entity 402 over the SAP 406 as discussed above with reference to FIG. 4.

TABLE 2

| Type | Primitive | Parameters | Function |
|---|---|---|---|
| DEV_TX_MESG_REQ | request | Trans_seq, Message | This primitive is used to load a message to a device for transmission. |
| DEV_TX_MESG_CON | confirm | Trans_seq | This primitive confirms that the device has loaded the message in Trans_Seq. |
| DEV_RX_MESG_IND | indicate | Trans_seq, Message, Rx_time, Rx_acc | This primitive is used to indicate that the device has received a message and transferred the message, the time it was received and (optionally) an estimate of the accuracy of the time. |
| DEV_RX_MESG_RES | response | Trans_seq, | This primitive is used to respond that the message associated with Trans_Seq is recognized. |
| DEV_TX_TIME_IND | indicate | Trans_seq, Tx_Trans_Seq, Tx_time, Tx_acc | This primitive is used to indicate the transmit time of the message associated with Tx_Trans_Seq and (optionally) an estimate of the accuracy of the Tx time. |
| DEV_TX_TIME_RES | response | Trans_seq | This primitive is used to respond that the information associated with Trans_Seq is recognized. |

Figure 6:
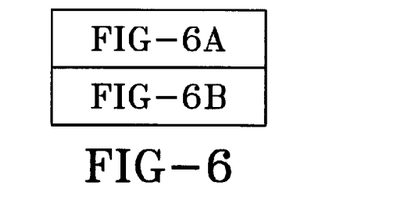
FIGS. 6A and 6B illustrate an embodiment of a method for and illustrate the passing of different service primitives between lower layers and upper layers and the passing of messages between two radios.
Figure 6A:
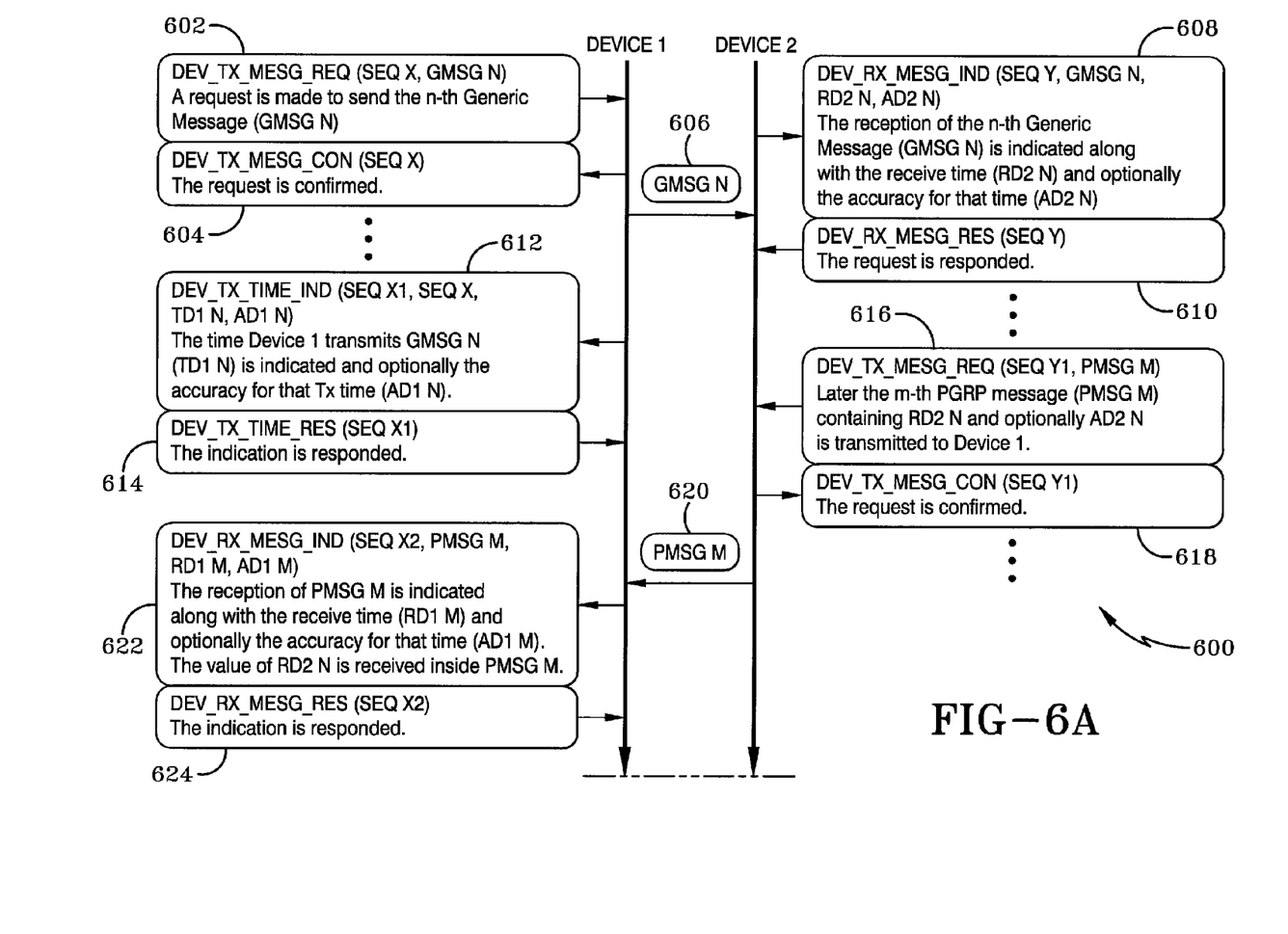
Figure 6B:
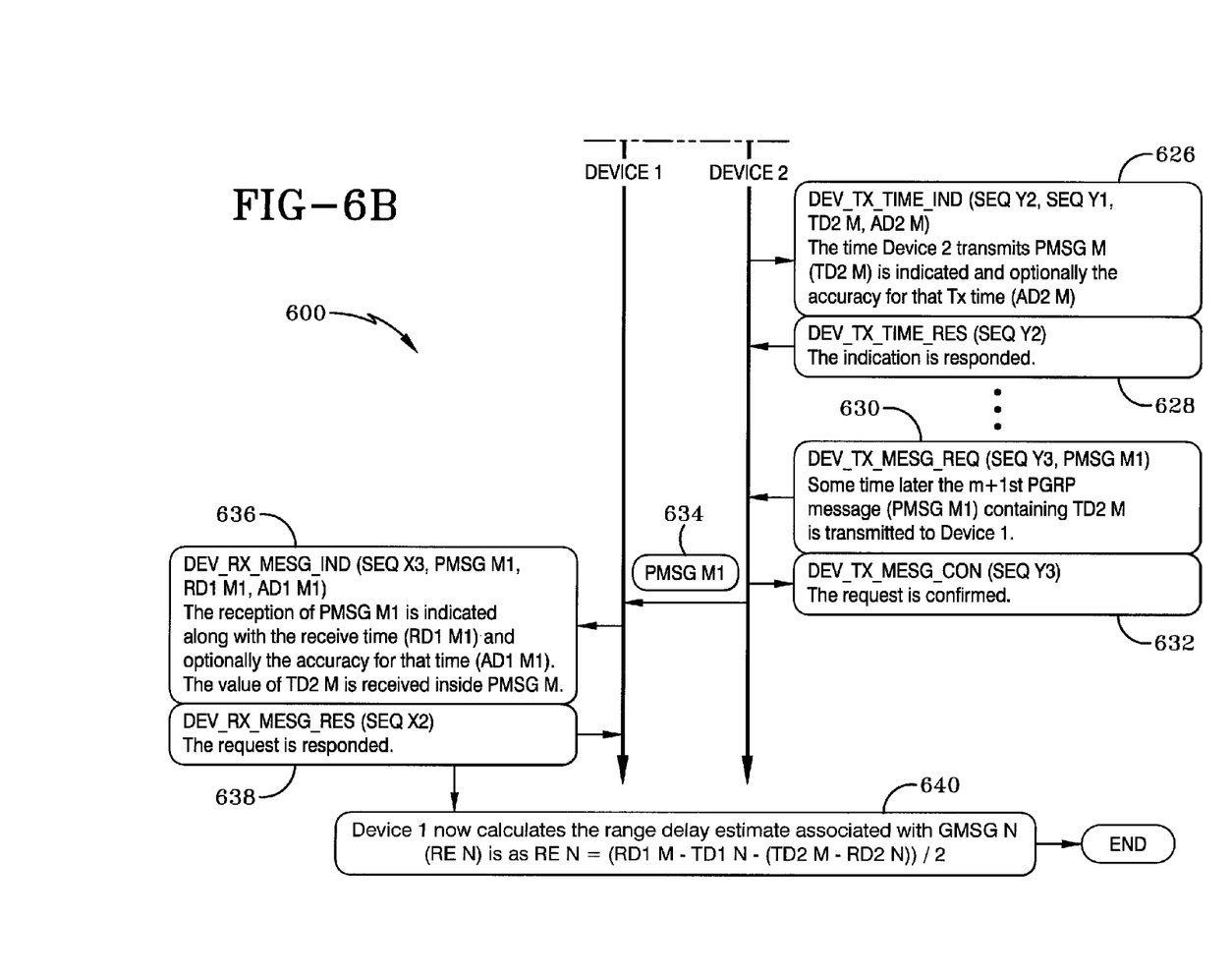

Referring to FIGS. 6A and 6B, these charts show how the logical structures defined can be used to implement a method 600 to compute range delay. FIGS. 6A and 6B contain a message sequence chart (MSC) which shows the order of messages and events with the messages and events on FIG. 6A preceding those of 6B. The method 600 assumes two types of messages—generic messages (GMSG) of unknown purposes opportunistically used to generate time stamps, and messages specific to the positioning and generic ranging protocol, (PGRP). If no generic messages are available (or if it is not desired to use them), PMSG can be used exclusively for the method. Note that side information such as device positions and velocities may be transferred in PMSG or other messages to improve upon the performance of this method 600. Groups of time stamps may be exchanged within a single PMSG to improve protocol efficiencies. However, the preferred method is shown in FIGS. 6a and 6b. Once range delays are computed, they may be exchanged between devices using PMSG for various purposes.

The method shown in FIGS. 6a and 6b requires an exchange of at least three messages to compute a range delay but assumes the PHY has no ability to make the current time a message is sent available as part of PHY frame format. In general, it is desired to minimize the time to collect the data required for the range delay computation. If the PHY frame format allows embedding the time of transmission in the frame, or the transmission time may be inferred by the MAC protocol, then shortcuts may be taken reducing the number of messages or time to pass the messages. For instance, some protocols advertise or require fixed transmission schedules so that the local time of transmission is known well in advance (e.g. as for MAP messages in the 802.16 protocol). Other MAC protocols require a fixed timing between a received message and a transmitted message (e.g. an ACK message or the RTS/CTS sequence in the 802.11 protocol). The PMSG may also be combined with (piggy backed) with GMSG for greater efficiency. Use of such short cuts are considered to be within the spirit of the invention. However, the shortcuts are not required to practice the method 600 which can be practiced without the shortcuts even if the shortcuts are available.

The example method 600 begins by a higher layer of device 1 (HL1) requesting a lower layer (device 1) to send, at 602, a message (nth Generic message—GMSG N) to device 2. Device 1 replies to HL1 confirming the HL1's request, at 604. The GMSG N is sent, at 606, to device 2. Note that the PHY of Device 1 may not know the transmit time until after the transmission occurs and may not have included the transmit time in GMSG N. The lower layer of device 2 (device 2) receives the GMSG N and notifies the upper layers of device 2 (HL2) that the GMSG N was received, at 608. This communication to HL2 from device 2 includes the receive time (RD2 N) of GMSG N and optimally includes the accuracy for the receive time (AD2 N). The HL2 responds, at 610, to device 2 to indicate that it has received GMSG N. Device 1 generates and sends a message, at 612, to indicate the transmit time (TD1 N) of GMSG N and optimally includes the accuracy (AD1 N) for that message. HL1 responds, at 614, indicating that the transmit time of GMSG N has been received.

The method 600 begins to initiate a new message (PMSG M), at 616. The message is initiated by HL2 sending a message request (DEV_TX_MESG_REQ) to the device 2. The message includes the receive time (RD2 N) and optimally its accuracy (AD2). Device 2 confirms it has received that request, at 618. Device 2 sends the PMSG M, at 620, through the air to device 1. Device 1 receives the message and generates a message to HL1, at 622, that indicates its receive time (RD1 M) and optimally its accuracy (AD1). The value of RD2

N is also received inside of PMSG M. HL1 responds to device 1, at 624, indicating it received the message. Concurrently or subsequently to device 1 receiving PMSG M, device 2 reports the transmit time (TD2 M) and optimally its accuracy (AD2 M) to HD2, at 626, and the HD2 responds, at 628 that it has received the transmit time.

After receiving the transmit time (TD2) of PMSG M, HD2 will next request, at 630, a new message PMSG M1 be sent to device 1 that includes TD2. Device 2 confirms that it is preparing to send that message, at 632. Device 2 transmits PMSG M1 from device 2 to device 1, at 634. After the message is received, device 1 sends a message to HL1, at 636, that indicates the receive time of PMSG M1 (RD1 M1) and optimally its accuracy. The body of the message also contains the transmit time (TD2 M) of PMSG M. HL1 responds, at 638, indicating that it has received that message from device 1. Now, HL1 has all the transmit and receive times it needs to calculate a range delay estimate between device 1 and device 2. One way HL1 can estimate the range delay (RE N) is by calculating, at 640:

$$RE N = (RD2N - TD1N + RD1M - TD2M)/2$$

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method for calculating a range delay comprising:
    transmitting a first message at a lower layer of a first node to a second node, wherein the first message is transmitted at a first transmit time;
    sending a first service primitive with the first transmit time, wherein the first service primitive is sent to an upper layer associated with the first node;
    receiving a second message at the lower layer of the first node containing a first receive time of the first message at the second node and optionally containing a second transmit time of the second message from the second node;
    determining at the lower layer of the first node a second receive time of the second message;
    sending a second service primitive with the first receive time of the first message at the second node and the second receive time of the second message at the first node to the upper layer associated with the first node;
    calculating a range delay in the upper layer based, at least in part, on one or more of the first transmit time, the first receive time, the second transmit time, and the second receive time; and
    sending a transmit service primitive from the upper layer to the lower layer instructing the lower layer to send the first message, wherein the lower layer sends the first message responsive to the transmit service primitive; and
    wherein the first node and the second node are radios and wherein the transmitting the first message further comprises:
    transmitting the first message out of an antenna at the first node.

2. The method for calculating the range delay of claim 1 further comprising:
    receiving a third message at the lower layer of the first node containing the second transmit time of the second message from the second node;
    sending a third service primitive from the lower layer to the upper layer, wherein the third service primitive includes the second transmit time.

3. The method for calculating the range delay of claim 2 wherein:
    the first transmit time=TD1-N;
    the first receive time=RD2-N;
    the second transmit time=TD2-M;
    the second receive time=RD1-M;
    and wherein the calculating the range delay further comprises calculating a range delay value of:

$$\text{range delay value} = (RD1M - TD1N - (TD2M - RD2N))/2.$$

4. The method for calculating the range delay of claim 2 wherein the calculating the range delay further comprises:
    calculating the range delay after the third service primitive is received at the upper layer associated with the first node.

5. The method for calculating the range delay of claim 1 further comprising:
    generating the first service primitive, the second service primitive and the third service primitive so that the first service primitive, the second service primitive and the third service primitive communicate between the lower layer and the upper layer using standardized commands and parameters.

6. The method for calculating the range delay of claim 1 further comprising:
    determining when a first symbol of the second message is received a the lower layer of a first node, wherein the second receive time is based, at least in part on when the first symbol is received.

7. The method for calculating the range delay of claim 1 wherein the second message contains a velocity of the second node and wherein the calculating a range delay further comprises:
    calculating the range delay based, at least in part, on the velocity.

8. The method for calculating the range delay of claim 1 further comprising:
    sending a confirmation service primitive from the lower layer to the upper layer confirming the transmit service primitive has been received.

9. The method for calculating the range delay of claim 1 wherein the second message contains an accuracy of the first transmit time and wherein the calculating a range delay further comprises:
    calculating the range delay based, at least in part, on the accuracy.

10. The method for calculating the range delay of claim 9 wherein the accuracy represents a standard deviation.

11. The method for calculating the range delay of claim 1 further comprising:

processing the first service primitive in an upper layer that is above the International Organization for Standardization's (ISO) Open Systems Interconnection (OSI) model's data link layer.

12. The method for calculating the range delay of claim 1 wherein the determining at the lower layer the second receive time further comprises:

determining the second receive time at a lower layer that is lower than the International Organization for Standardization's (ISO) Open Systems Interconnection (OSI) model's network layer.

13. The method for calculating the range delay of claim 1 further comprising:

sending the first service primitive with a first transaction sequence number that uniquely identifies the first service primitive; and sending the second service primitive with a second transaction sequence number that uniquely identifies the second service primitive.

14. A method for determining a range delay between two radios comprising:

transmitting from a lower layers in a first radio one or more wireless messages to a second radio;

receiving at the lower layers in the first radio one or more wireless messages from the second radio;

sending one or more service primitives from the lower layers in the first radio to a higher layers associated with the first radio, wherein the one or more service primitives contain one or more message parameters of the wireless messages transmitted to the second radio and the one or more message primitives of the wireless messages received from the second radio;

and calculating a range delay in the upper layer device based, at least in part on the message parameters;

sending the one or more service primitives from the lower layers in the first radio to the higher layers associated with the first radio using a standard service primitives with standard primitive parameters;

transmitting the service parameters with a standard primitive parameters from a plurality of different radios with a plurality of different types of lower layers to the upper layers of the first radio, wherein the service parameters with the standard primitive parameters include a plurality of radio parameters;

tracking each of the plurality of different radios based, at least in part, on the radio parameters.

15. The method for determining the range delay between two radios of claim 14 wherein the generating one or more service primitives further comprises:

routing the one or more service primitives through a standard network serviced access point (NSAP), wherein the NSAP allows different lower layer devices in other different radios to communicate through the standard NSAP to the higher layer device.

16. The method for determining the range delay between two radios of claim 14 further comprising:

sending at least one service primitive from the higher layers to the lower layers in the first radio to cause the lower layers to transmit one or more wireless messages.

17. The method for determining the range delay between two radios of claim 14 further comprising:

operating the lower layer device below the International Organization for Standardization's (ISO) Open Systems Interconnection (OSI) model's network layer.

\* \* \* \* \*